(12) United States Patent
Hammacher

(10) Patent No.: US 9,637,249 B2
(45) Date of Patent: May 2, 2017

(54) METHOD AND APPARATUS FOR FILLING A MULTI-ROW PACKAGING TRAY WITH PIECE-FORM PRODUCTS

(75) Inventor: Heinz-Peter Hammacher, Bamberg (DE)

(73) Assignee: LOESCH VERPACKUNGSTECHNIK GMBH, Altendorf (DE)

(*) Notice: Subject to any disclaimer, the term of this patent is extended or adjusted under 35 U.S.C. 154(b) by 1074 days.

(21) Appl. No.: 13/825,509

(22) PCT Filed: Sep. 21, 2011

(86) PCT No.: PCT/EP2011/066447
§ 371 (c)(1),
(2), (4) Date: May 29, 2013

(87) PCT Pub. No.: WO2012/038475
PCT Pub. Date: Mar. 29, 2012

(65) Prior Publication Data
US 2013/0239525 A1    Sep. 19, 2013

(30) Foreign Application Priority Data
Sep. 24, 2010    (DE) .................. 10 2010 041 346

(51) Int. Cl.
*B65B 1/04*    (2006.01)
*B65B 5/06*    (2006.01)
(Continued)

(52) U.S. Cl.
CPC .............. *B65B 1/04* (2013.01); *B65B 5/068* (2013.01); *B65B 5/10* (2013.01); *B65B 23/14* (2013.01);
(Continued)

(58) Field of Classification Search
CPC  B65B 5/068; B65B 5/10; B65B 12/14; B65B 12/16; B65B 5/12; B65B 5/14;
(Continued)

(56) References Cited

U.S. PATENT DOCUMENTS 3,448,696 A * 6/1969 Verhoeven .............. B65B 23/14
426/503
4,016,788 A * 4/1977 Hardy ................. B65G 15/105
198/436
(Continued)

FOREIGN PATENT DOCUMENTS

DE    EP 0644119 A1 *    3/1995 ............. B65B 23/14
EP         0644119           1/1998
(Continued)

*Primary Examiner* — Stephen F Gerrity
*Assistant Examiner* — Joshua Kotis
(74) *Attorney, Agent, or Firm* — Cislo & Thomas, LLP

(57) ABSTRACT

A tray loading packaging machine that carries out a method for filling a multi-row packaging tray with piece-form products at a high performance level, having the following steps: dividing up a single-row stream of piece-form products onto a plurality of lanes arranged substantially parallel to one another in order to convey the products further; synchronizing the individual streams of products on the plurality or lanes with one another such that in each case one product from one lane can be transferred to the packaging tray substantially at the same time as in each case one product from the other lanes; and transferring the produces to the packaging tray, wherein in each case one product from one lane is transferred to one row of the packaging tray.

15 Claims, 3 Drawing Sheets

(51) Int. Cl.
  *B65B 23/14* (2006.01)
  *B65B 23/16* (2006.01)
  *B65B 35/44* (2006.01)
  *B65G 47/71* (2006.01)
  *B65B 57/14* (2006.01)
  *B65B 5/10* (2006.01)
  *B65B 57/20* (2006.01)

(52) U.S. Cl.
  CPC .............. *B65B 23/16* (2013.01); *B65B 35/44* (2013.01); *B65B 57/14* (2013.01); *B65G 47/71* (2013.01); *B65B 57/20* (2013.01)

(58) Field of Classification Search
  CPC  B65B 5/16; B65B 35/44; B65B 23/14; B65B 23/16; B65B 57/14; B65G 47/31; B65G 47/71; B65G 47/715; B65G 47/72
  USPC ......................................................... 53/473
  See application file for complete search history.

(56) References Cited

U.S. PATENT DOCUMENTS

| | | | | |
|---|---|---|---|---|
| 4,308,944 A | * | 1/1982 | Probst | B65G 47/31 198/442 |
| 4,640,408 A | * | 2/1987 | Eaves | B65G 43/08 198/460.1 |
| 4,736,570 A | * | 4/1988 | Hardage | B65B 23/12 53/443 |
| 4,807,741 A | * | 2/1989 | Simelunas | B65B 5/10 198/477.1 |
| 5,070,995 A | * | 12/1991 | Schaffer | B65G 43/10 198/460.1 |
| 5,209,339 A | * | 5/1993 | Antonissen | B65G 43/08 198/419.1 |
| 5,303,811 A | | 4/1994 | Haley | |
| 5,582,284 A | * | 12/1996 | Calladine | B65G 51/03 198/367 |
| 5,603,199 A | * | 2/1997 | Hammacher | B65B 5/105 53/247 |
| 5,761,883 A | | 6/1998 | Pruett et al. | |
| 5,863,177 A | * | 1/1999 | Carson | B65B 5/068 198/392 |
| 6,244,421 B1 | * | 6/2001 | Hall | B65G 43/08 198/460.1 |
| 6,371,287 B1 | * | 4/2002 | Jones | B65D 71/0022 206/173 |
| 6,897,625 B2 | * | 5/2005 | Brixius | B65G 47/31 198/571 |

FOREIGN PATENT DOCUMENTS

| | | | |
|---|---|---|---|
| EP | 1164096 | 12/2001 | |
| EP | 2354052 A1 * | 8/2011 | .......... B65G 47/715 |
| WO | WO 92/21564 | 12/1992 | |

* cited by examiner

METHOD AND APPARATUS FOR FILLING A MULTI-ROW PACKAGING TRAY WITH PIECE-FORM PRODUCTS

FIELD OF THE INVENTION

The invention relates to a method and an apparatus for filling a multi-row packaging tray with piece-form products.

BACKGROUND

The invention relates in particular to a packaging machine for filling multi-row packaging trays with piece-form, products, or example damageable products or the confectionery and long-life bakery products industry, for example single- or multi-Layer cookies, sponge cakes, chocolate products and the like. In this case, such products are arranged in single- or multi-row packaging trays in any desired arrangement, for example on edge, flat or imbricated. The invention relates in particular to an arrangement of such products in multi-row packaging trays. The invention thus relates to what is known in the art as a tray loading packaging machine.

Such machines are suitable not only for the abovementioned products of the food industry but also for packaging other piece-form products, for example technical products such as electronic or electrical components, machine elements, pharmaceutical or medical produces and the like, which are generally produced and sold in large numbers. In the present case, the machine according to the invention, is described for example by way of the packaging of cookies.

Piece-form products, for example cookies, are transferred directly, continuously or intermittently to the packaging machine from an upstream, production plant, generally via a plurality of parallel lanes, said packaging machine filling them into packaging trays. These trays are formed typically from a colored or transparent. Lightweight plastics material and they hold the cookies for example in a stacked manner standing on edge, as a result of which the cookies are protected against breaking up during transport. The trays have a row or a plurality of rows (cavities) arranged parallel to one another for holding the products. After, being filled with the cookies, the trays are typically wrapped with a packaging film and/or cardboard packaging and closed.

In tray loading packaging machines from the prior art, the individual rows, arranged parallel to one another, of multi-row packaging trays are generally filled with cookies in succession, i.e. on a row-by-row basis. For this purpose, it is necessary for the feeding devices for transferring the cookies to the packaging tray and/or the packaging tray itself to be moved to and fro multiple times in relation to one another. This method necessitates a relatively slow speed of filling of the trays with cookies, i.e. a relatively low output or the packaging machine. In known machines of this type, the products can be packed typically at an output of 800 to 1000 products per minute.

However, today, these outputs are no longer considered sufficient and there is therefore a desire to use machines for filling multi-row packaging trays at a higher packaging speed, i.e. a higher output. Therefore, it is the object or the present invention to create a packaging machine for filling multi-row packaging frays with piece-form products, said packaging machine having a higher output than the machines known from the prior art.

This object is achieved by a method for filling a multi-row packaging tray with piece-form products and also by a corresponding apparatus according to the claims and the equivalents to the claims appended hereto. Accordingly, according to the invention, the filling of a multi-row packaging tray with piece-form products no longer takes place on a row-by-row basis, i.e. each row of the packaging tray individually in succession, but rather the rows, arranged alongside one another, of the packaging tray are filled with the products substantially at the same time as, parallel to or synchronously with one another.

SUMMARY

According to the invention, the mentioned object is thus achieved by a method and an apparatus for filling a multi-row packaging tray with piece-form products, wherein the following steps are carried out: dividing up a single-row stream of piece-form products onto a plurality of lanes with one another such that in each case one product from one lane can be transferred to the packaging tray substantially at the same time as in each case one product from the other lanes; and transferring the products to the packaging tray, wherein in each case one product from one lane is transferred to one row of the packaging tray.

Thus, according to the invention, each row of a multi-row packaging tray is filled with in each case one product substantially at the same time, parallel to or synchronously with one another. This filling operation is repeated continuously until the packaging tray has been completely filled with products. To this end, after being filled with in each case one layer or group of products (i.e. in each case one product per row) the packaging tray is moved on by one position so that the next layer or group of products can be filled into the tray, i.e. again in each case one product per row.

The number of lanes arranged alongside one another or parallel to one another, on which the piece-form products are conveyed in the packaging machine and, before filling rate packaging tray, are synchronized with one another in terms of their conveying movement and position and aligned with one another, corresponds to the number of rows to be filled of the packaging tray. Each conveying lane is in this case assigned to in each case one row of the packaging tray. The packaging tray is advanced in the transfer station substantially in a direction perpendicular or at a settable angle to the direction of the product conveying lanes, in order that successive groups of the products can be transferred from the conveying lanes arranged parallel to one another in each case into the rows arranged alongside one another of the packaging tray. In particular embodiments, the angle between the movement direction of the packaging tray and the direction of the product conveying lanes can be set to be more or less flat, so that the packaging tray is advanced not substantially perpendicularly but more or less horizontally, such that it is flat, and the piece-form products are thus introduced into the packaging tray such that they are more or less flat.

In a preferred embodiment of the invention, the initially single-row streams of piece-form products is divided up into successive groups of products and conveyed further in these product groups. In each case one such product group is then fed to in each case one of the lanes arranged substantially parallel to one another. In this case, the successive product groups are fed cyclically to the conveying lanes such that conveying lanes arranged alongside one another are fed in succession with in each case one product group.

In a further preferred embodiment of the invention, the product streams on the lanes arranged substantially parallel to one another are synchronised such that the product stream on each of the lanes is separated out in such a way that respectively successive individual products from the product stream are conveyed further at a spacing from one another, and that the speed of further conveying of the individual products on the lanes arranged substantially parallel to one another is controlled such that the products on all of the lanes are in positions at the end of the lanes, before being transferred to the packaging tray, such that each product from each lane is transferred to the packaging tray at substantially the same time as, synchronously with the products from the other lanes.

In a further embodiment of the invention, it is provided for the single-row product stream, which is divided up onto the plurality of conveying lanes arranged substantially parallel to one another, to be formed beforehand from the piece-form products, which, immediately after their production, are fed to a plurality of lanes arranged substantially parallel to or alongside one another and are combined to form the single-row product stream.

In the case of the embodiment of a packaging machine according to the invention that is described in the following text, the piece-form products are transferred to the packaging machine on two lanes from the production process, with three-row packaging trays then being filled with the produces.

Compared with the machines known from the prior art for filling multi-row packaging trays with piece-form products, the packaging machine according to the invention has the advantage that it has a higher packaging speed and thus overall a higher output.

Further advantages and details or the invention will become apparent from the following detailed description of an exemplary embodiment of the machine according to the invention with reference to the appended drawings.

DETAILED DESCRIPTION OF THE INVENTION

Figure 1:
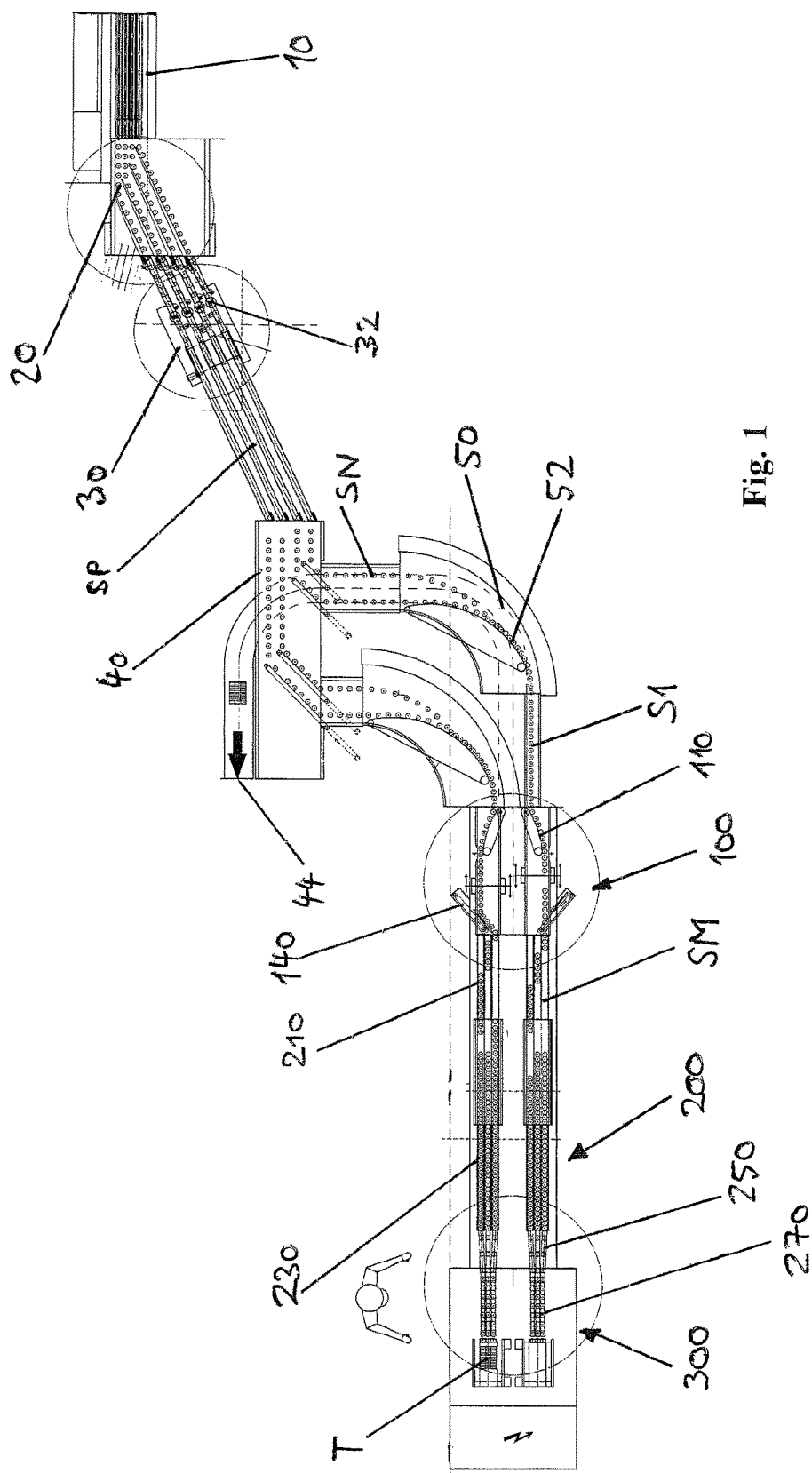
FIG. 1 shows a plan view from above of an embodiment of the packaging machine according to the invention including devices for feeding the piece-form products to be packaged from their production.

FIG. 1 shows a schematic overall view of an embodiment of a tray loading packaging machine in a plan view from above. The piece-form products, for example cookies and the like, are fed to the actual packaging machine from an upstream production plant 10 (top right in the illustration of FIG. 1) on a plurality of lanes SP arranged alongside one another. In the process, one fed products are initially combined into a single-row product stream S1 by a combining device 50 and are subsequently divided up in the machine area 100 onto a plurality of conveying lanes SM arranged alongside one another. In the following machine area 200, the individual streams of the products on the conveying lanes SM are separated out and synchronized such that the products can be transferred (bottom left in FIG. 1) at the end of the conveying lanes SM in the machine area 300 (tray loading station), in a group or layer formed in each case by one product per conveying lane SM, to the rows located alongside one another of the packaging tray T, substantially at the same time as, parallel to or synchronously with one another. The individual areas and functions of this packaging machine will be described in more detail in the following text.

As FIG. 1 illustrates, the piece-form products are transferred into the packaging machine from an upstream production plant 10 for the piece-form products by means of a feeding device 20. In the embodiment illustrated, the products are introduced into the packaging machine on four product conveying lanes SP arranged alongside one another. In particular when the piece-form products to be conveyed and packaged are cookies, for example two-layer cookies, in the case of which two circular cookie parts are connected together by way of a filling cream (what are known as sandwich cookies), checking or inspection devices 30 can be produced following the feeding device 20, said checking or inspection devices 30 checking the parameters of the products (cookies) that are important for the filling of the packaging tray T that is ultimately carried out. In the inspection area 30 and/or following the feeding device 20, in the case of sandwich cookies, the products are transported on conveying lanes SP which are produced with vertical belts at which the round cookies rotate as they pass, with the result that centering of the upper and lower cookie (covers) with the filling mass located in between is achieved or improved.

In the region of the inspection section 30, the product parameters that are important for automatic tray filling are checked, for example the thickness or height and the diameter of the cookies. By means of sensors and/or camera systems 32, the products are checked for damage (e.g. breakage) and particular quality parameters are determined. Products which do not meet the quality requirements are then removed from the conveying lane SP by means of pneumatic apparatuses or the like, i.e. they do not pass into the actual packaging machine and are thus ultimately not filled into the packaging trays T.

In the embodiment of the packaging machine illustrated in FIG. 1, the products fed on the four conveying lanes SP arranged alongside or parallel to one another are divided up onto two plant parts following the inspection area 30. Of the four feeding lanes SP, two lanes are fed to a left-hand plant part and two lanes are fed to a right-hand plant part, i.e. the products fed on two of the four lanes SP are supplied to each of the two plant parts for further conveying. This operation is carried out in the separating apparatus 40. The two subsequent plant parts are substantially identical to one another in terms of their individual components and mode of operation, but they operate independently of one another. If a fault occurs in one of the two plant parts, the other plant part can continue to operate in an unimpeded manner. In this case, only half of the product stream originally fed into the packaging machine is then packaged into the packaging trays T, while the other half, intended for the second, faulty plant part, of the original product stream is removed by means of output devices 44.

Whereas in the present embodiment, dividing up of the fed products onto two plant parts is illustrated, it goes without saying that it is also possible for dividing up onto a plurality of plant parts to take place in a corresponding manner. In the case of packaging plants having a cascade of a plurality of packaging tray filling stations (tray loading stations or tray loaders) and a standby machine at the end of the cascade, the products are received by the standby machine when one tray loader breaks down.

In the following description, the packaging machine is described on the basis of one plant part. Since the plant parte are generally substantially identical to one another, it goes without saying that this description thus also applies in a corresponding manner to the further plant parts of this kind of the packaging machine as a whole.

Following the separating device 40, which divides the products fed as a whole onto two plant parts in the present embodiment, the products are then conveyed further on two lanes SM and into the relevant plant part. In the subsequent combining device 50, the products from the two conveying lanes SP running substantially parallel to or alongside one another are then combined onto one lane S1. The purpose of this measure is to obtain a gapless, continuous, single-row product stream S1.

By means of a curved conveyor device 50, what is known as the "accumulation principle" is used in order to carry out this combining of the products from the two lanes in onto one lane or to form the single-row product stream S1. In the specific embodiment of FIG. 1, the products (cookies) on the two lanes SN are initially brought to a small spacing by a chicane, e.g. a vertical belt, and are then fed to a curved belt 52 on the inner radius. By way of a chicane, e.g. a curved vertical belt, fitted on the curved belt 52, the cookies are then guided to the outer radius of the curved belt. The resulting increase in speed and the lateral pressure on the cookies cause the two product lanes SN to be combined to form one lane S1.

In order to combine the lanes reliably in the present embodiment, the speed at the outer radius of the curved belt is greater than would be necessary for a gapless single-row stream of cookies. Since a high transporting speed is disadvantageous for the subsequent process steps, the stream of cookies is subsequently guided by a further chicane back to the inner radius of the curved belt, specifically to that radius at which precisely the speed required for a gapless single-row product stream prevails.

A single-row continuous gapless product stream S1 is thus present at the outlet from the combining device (in particular the curved conveying device) 50. In the subsequent method step, this single-row product stream is then divided up onto a plurality of lanes SM arranged substantially parallel to or alongside one another, the products then being conveyed further on said lanes SM. In the present case, illustrated in the figures, three conveying lanes SM1, SM2, SM3 are arranged alongside one another. The number of lanes corresponds to the number of rows (cavities) of the packaging tray T that in the end are to be filled at the same time with the products. It goes without saying that any other number of lanes SM arranged alongside one another and suitable for a specific application can also be provided in a manner corresponding to a number of rows of the packaging tray that are to be filled.

The single-row continuous product stream S1 is divided up onto the plurality of lanes SM or SM1, SM2, SM3 arranged parallel to one another in that the product stream S1 is initially divided up into successive groups PG formed from individual piece-form products P and these product groups PG are then conveyed further, and in that subsequently in each case one product group PG is then supplied to in each case one of the lanes SM1, SM2, SM3 arranged parallel to one another.

Figure 2:
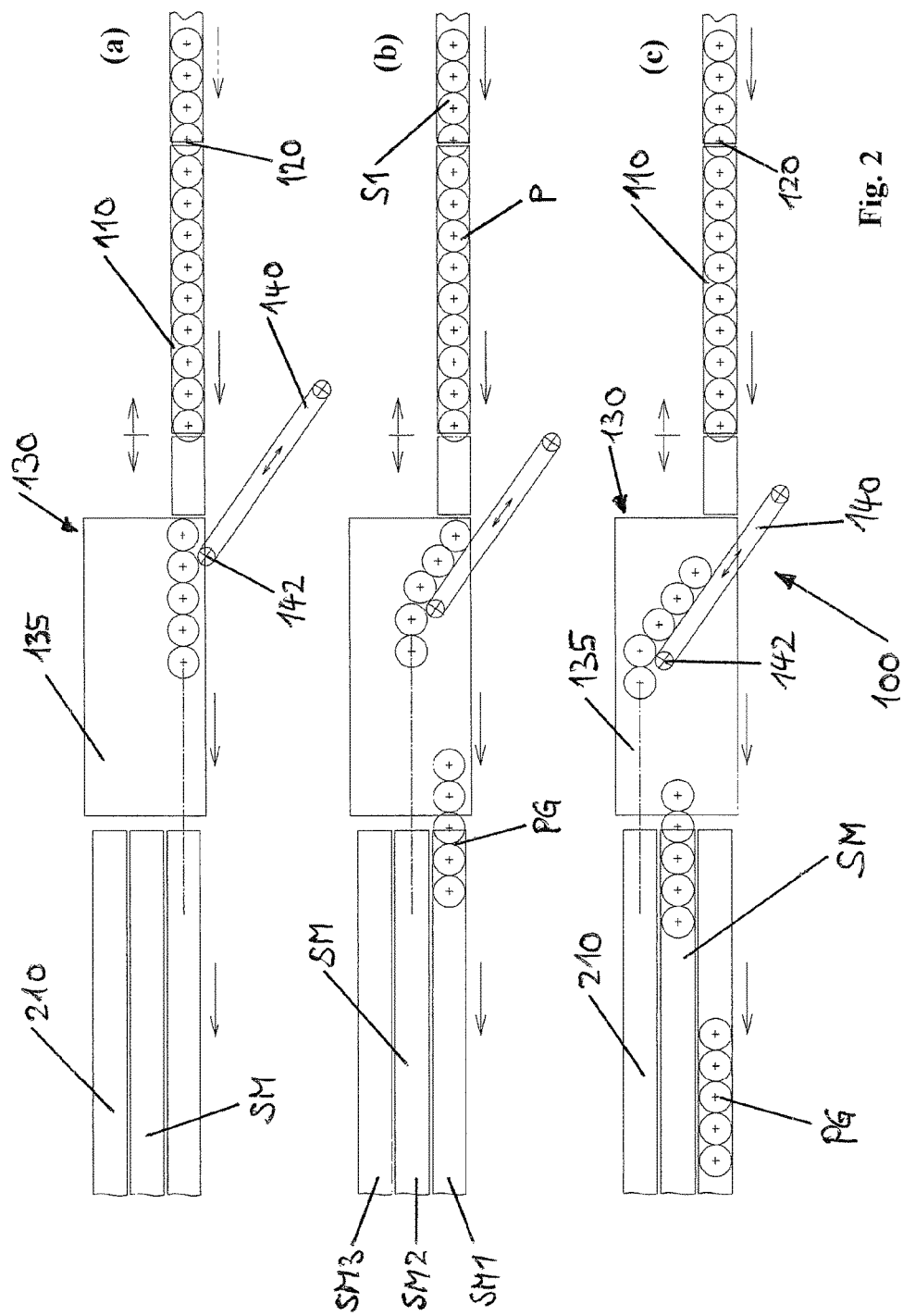
FIG. 2 is a detail of the packaging machine from FIG. 1 and shows the apparatuses for dividing up the product stream onto a plurality of lanes arranged alongside one another on an enlarged scale at three different stages.

As is shown in FIG. 1 and, in an enlarged illustration, in particular in FIG. 2, conveying devices 100 for dividing up the single-row product stream S1 into the product groups PG and for conveying the product stream further in the form of the product groups PG are provided. In this case, these conveying devices 100 comprise first of all a conveying belt, in particular what is known as a pull-nose belt 110, and also one or more devices 120 for counting the piece-form products P, in order to form the product groups PG from the single-row product stream S1 from a predetermined number of piece-form products P and at a predetermined spacing from one another. The pull-nose belt 110 can in this case be for example a conveying belt that conveys in the conveying direction of the product stream and is movable to and fro or back and forth as a whole parallel to the conveying direction of the product stream.

As FIG. 2 shows in the three part illustrations (a), (b) and (c) (which show three different stages of the dividing-up apparatus 100 and in particular a distribution device 130), the single-row, continuous product, stream S1 (coming in each case from the right in the three part illustrations in FIG. 2) are fed to a conveying belt that is movable to and fro as a whole, what as known as a pull-nose belt 110, on which the product groups PG are formed at a defined spacing from one another. The mode of operation of such a pull-nose belt is known in principle, with such a belt operating typically cyclically in the same cycle. However, unlike in the case of the known belts, the present pull-nose belt 110 is not cycled according to a fixed time frame. Instead, the pull-nose belt 110 is cycled here such that groups PG having a predetermined number of individual products P (e.g. cookies) are created.

To this end, a right barrier or comparable counting device 120 in arranged substantially in the rear position of one pull-nose belt 110 (in FIG. 2 in the position arranged in each case on the right) or at or in the region or the rear end of the pull-nose belt 110, said light barrier counting the products from the continuous product stream S1 running through (from right to left in the drawings). Once the counting device 120 has counted the number of products it predetermined for a product group PG, the pull-nose belt receives this group PG in that it travels for example as a whole into the rear position (on the right in the drawing). The pull-nose belt then remains in this rear position until the desired number of products P has passed this point. As soon as the counting device 120 has counted the desired number of products P, the pull-nose belt 110 travels forward as a whole in the conveying direction (i.e. to the left in the drawings), carrying along the counted number of products P and as a result creating the group PG with the desired number of products. At the same time, the counting device 120, i.e. the counter coupled to the light barrier, begins to count the products P running through for the next group PG, The pull-nose belt 110 of the present embodiment thus operates differently than pull-nose belts known in the prior art, which always operate, cyclically in the same clock cycle.

The pull-nose belt 110 of the present application has in particular the following purposes: in the plant of the present embodiment, in upstream process steps the products (cookies) P are checked for particular quality features and in the event of quality defects are removed from the continuous flow (as was explained above, later alia in conjunction with the inspection area 30). As a result, more or less large gaps ere produced in the product flow, i.e. the single-row product stream S1 fed to the pull-nose belt 110 can contain gaps. If the pull-nose belt were operated in a purely time-controlled manner, groups PG having different numbers of products P would then be formed. This would result in different filling levels on the subsequent lanes SM, which are ultimately fed to the tray loader (filling of the packaging trays), and this would result in nonuniform filling of the rows of the packaging tray T and would also have further disadvantages. However, in the present embodiment, the pull-nose belt 110 remains in the rear position until the required number of products P for the product group PG has been reached. This thus ensures that the product groups PG conveyed further always have the same number of individual products P. The gaps that previously possibly occurred in the product stream are thus eliminated or "suppressed".

The pull-nose belt 110 of the present embodiment furthermore has the purpose of it also being possible to create variable sites of the product groups PG in a specific manner. This function is used, if appropriate, to equalize the filling levels or the subsequent lanes, if these deviate from one another for particular reasons, for example on account of the intervention of an operator. The filling level of the lanes SM, which are fed to the tray loader, is monitored by the higher-level control of the plant, in conjunction with the installed sensor system. If the filling levels deviate from one another more than is permitted, the pull-nose belt is controlled such that lanes having a low filling level are allocated larger product groups.

Following group formation by the pull-nose belt 110, the product groups PG are then each fed to one of the subsequent lanes SM1, SM2, SM3 arranged parallel to or alongside one another, specifically such that successive product groups PG are fed cyclically to the lanes SM1, SM2, SM3 such that lanes arranged alongside one another are fed in succession with in each case one product group PG.

The distribution device 130 following she pull-nose belt 110 has for this purpose a deflecting belt 140 that as displaceable substantially transversely or obliquely to the conveying direction of the product stream, said deflecting belt 140 feeding in each case one of the product groups PG fed by the pull-nose belt 110 in succession to in each case the neat of the conveying belts SM1, SM2, SM3 arranged alongside one another.

As FIG. 2 shows in the three different stages illustrated, the product groups PG formed by the pull-nose belt 110 are fed in the distribution device 130 to a conveying belt 135 which conveys in the main transporting direction and on which there is located a deflecting belt 140, in particular a chicane belt, formed as a vertical belt, having a displaceable diverting edge 142. The deflecting belt 140 is inclined at a particular angle (e.g. about 30°) to the transporting direction of the products P on the conveying belt 135. The position of the diverting edge 140 is positioned on one of the three lanes SM1, SM2, SM3 by the higher-level control by means of a servomotor, i.e. the diverting edge 142 of the chicane belt 140 is displaced laterally (in the view from above according to FIG. 2), substantially obliquely or transversely to the conveying direction of the conveying belt 135, in each case to the position or height of one of the three lanes SM1, SM2, SM3. The products P (or in each case an entire product group PG) coming from the pull-nose belt 110 and conveyed further on the conveying belt 135 then strike the deflecting colt 140 and run along the latter (or are conveyed thereby) until they leave it at its end (diverting edge 142), where they are then conveyed further by rate conveying belt 135 in the main transporting direction in the resulting lateral position. As a result, the products P or product groups PG are each guided onto that one of the subsequent conveying lanes SM1, SM2, SM3 that corresponds to the respective lateral setting or displacement of the deflecting belt 140 or position of its diverting edge 142.

Once a group PG of the products has left the deflecting belt 140, the diverting edge 142 of the deflecting belt 140 is displaced laterally and positioned on the next lane of the lanes SM arranged alongside one another. In this way, the product groups PG are guided in succession to the successive lanes SM1, SM2 and SM3 (corresponding to stages (a), (b) and (c) in FIG. 2). Once a product group PG has been fed to the last of the lanes SM arranged alongside one another, that is to say the lane SM3 in the present embodiment (stage (c) in FIG. 2), the deflecting belt 140, or its displaceable diverting edge 142, runs back into the first position (stage (a) in FIG. 2), in which the first of the lanes SM arranged alongside one another, that is to say the lane SM1 in the present embodiment, is now filled with the upcoming next product group PG, and as a result the cycle of the lateral deflection of the product groups PG in the distribution device 130 begins again with corresponding successive filling of the lanes SM1, SM2 and SM3.

In a particular embodiment of the distribution device 130, it is possible, at high throughputs, for the temporal gap between two successive product groups PG not to be sufficient for positioning the diverting edge 142 of the deflecting belt 140 on the in each case next lane SM1, SM2, SM3. The reasons may reside in limitations as a result of mechanical components or the drive. In this case, the deflecting belt 140 preferably carries out only a pre-distribution of the product groups PG, i.e. the groups are not moved to the final position for the subsequent lane but only brought into a spacing such that in a subsequent step final positioning can take place. This subsequent step can comprise for example rigid deflecting or chicane belts or movable "paddles".

Once the successive product groups PG have been divided up into the lanes SM arranged alongside one another, the individual streams of the products P or product groups PG on the lanes SM1, SM2, SM3 are synchronised with one another such that ultimately in each case one product P from one lane can be transferred in the transfer apparatus 300 to the packaging tray T substantially at the same time as in each case one product from the other lanes. This synchronizing process is illustrated in FIG. 3.

This method step of synchronising comprises firstly the step of separating out the product stream on each of the lanes SM1, SM2, SM3 such that respectively successive individual products P from the product stream are conveyed further at a spacing from one another, and also the snap of controlling the speed of further conveying of the individual products P on the lanes SM1, SM2, SM3 arranged substantially parallel to one another such that the products P on all the lanes are in positions at the end of the lanes such that each product P from each lane SM1, SM2, SM3 is transferred to the packaging tray T at substantially the same time as the products P from the other lanes.

Figure 3:
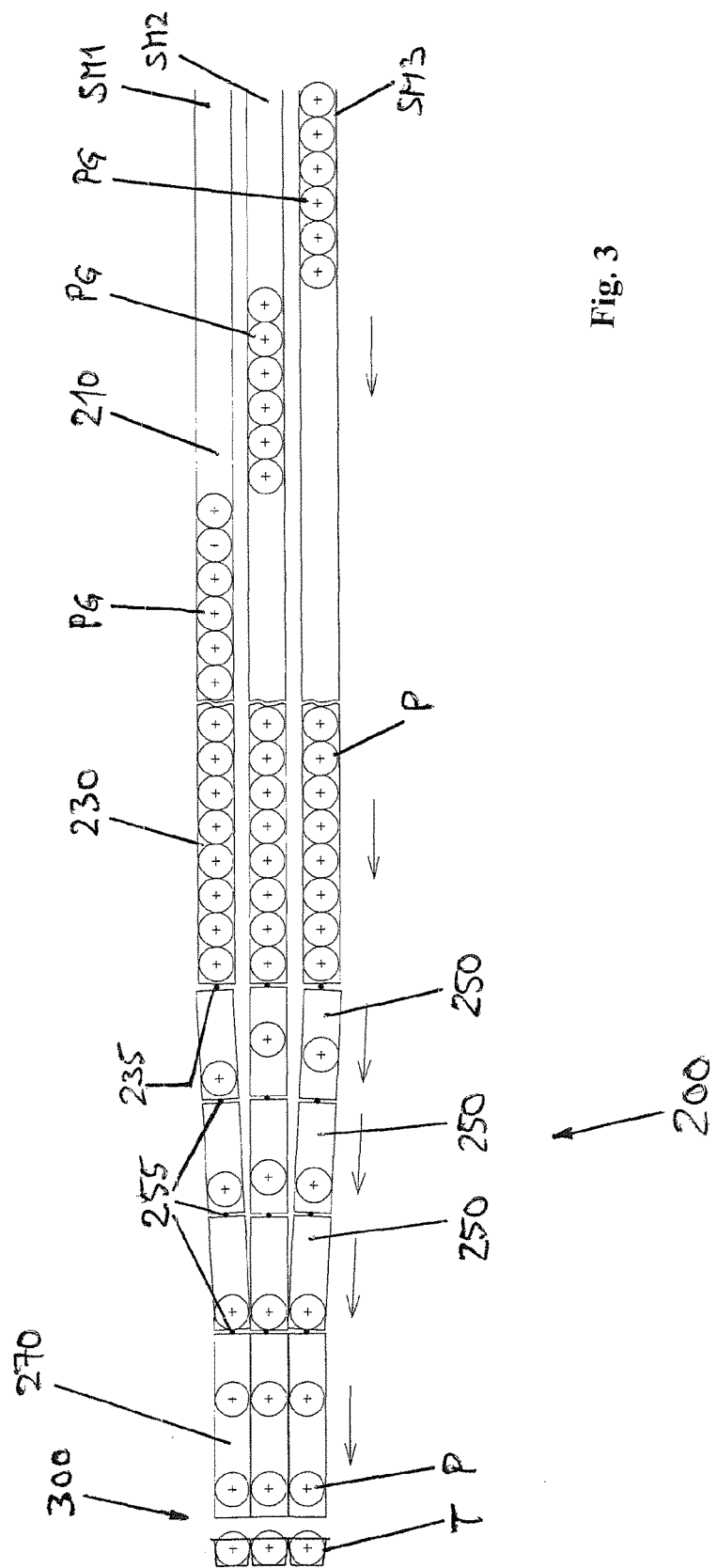
FIG. 3 is a further detail of the packaging machine from FIG. 1 and shows on an enlarged scale the apparatuses for synchronising the product streams on the lanes arranged alongside one another.

As FIG. 3 shows, the apparatuses 200 for synchronising the product streams on the lanes SM1, SM2, SM3 arranged parallel to one another comprise a plurality of conveying devices arranged in succession in the conveying direction, said conveying devices being present equally in each of the lanes SM1, SM2, SM3 and being arranged accordingly parallel to or alongside one another. These conveying devices comprise gap closing belts 210, feeding belts 230, smart belts 250 and infeed belts 270. In the embodiment illustrated in FIG. 3, these conveying devices are arranged in succession in the abovementioned order in the conveying direction of the product stream. The respective conveying belts of the lanes SM1, SM2, SM3 arranged parallel to one another are identical to one another, and they can in practice have further necessary or advantageous components, such as lateral guides, covers and sensor devices.

As FIG. 3 shows, upstream of or at the inlet of the synchronising apparatuses 200, there are first of all provided gap closing belts 210 which directly adjoin the above-described distribution device 130. The product groups G formed and fed by the distribution, device 130 are thus guided to the gap closing belts 210. These gap closing belts 210 serve to close up the received product groups PG without gaps downstream (i.e. toward the left in the illustration in FIG. 3) toward the end of the product stream. On each of the lanes SM1, SM2, SM3, a gapless stream, of products P is thus formed from the previously formed individual product groups PG by the gap closing belts 210.

At their ends, the gap closing belts 210 transition downstream into the feeding belts 230 or the feeding belts 230 adjoin the gap closing belts 210 on the downstream side. The gapless product, stream formed in the gap closing belts 210 is thus transferred to the feeding belts 230 and conveyed further downstream there. The basic speed of the feeding belts 230 corresponds to the output of the overall packaging plant, i.e. on the dispensing side as many products P are dispensed per unit time as corresponds to the plant output.

Insofar as the feeding belts 230 operate at a constant, unregulated speed, the products P to be dispensed theoretically at the same time onto the packaging tray T are as a rule located not in a line, it being possible for this to be caused by tolerances of the products on the various lanes and also other influences. The asynchronicity between the products P can in this case be so large that even with the subsequent smart belts 250, it is no longer possible to achieve sufficient equalization. This would then result in defects in the transfer of the products P to the packaging trays T (tray loading).

For this reason, the feeding belts 230 are regulated by means of suitable control devices. These control devices comprise sensors 235 which are arranged at the dispensing position of the feeding bolts 230. The sensors 233 detect the position of the products P (in particular in the conveying direction) during transfer to the subsequent smart belts 250. A higher-level control device then regulates the speed of the feeding belts 230 such that a possible excessive positional deviation of the products at the dispensing point from the feeding devices 230 is reduced so that the positional deviation of the products P (in the conveying direction) on each of the lanes SM1, SM2, SM3 arranged parallel to one another is within a permissible tolerance.

The feeding belts 230 are adjoined downstream by smart belts 250. At the transition from the feeding belts 230 to the smart belts 250, the gapless product stream present on the feeding belts 230 is separated out, i.e. subsequently the products P from the product stream are conveyed further in each case following one another individually at a spacing from one another. At the transition of the products P from the feeding belts 230 to the subsequent smart belts 250, a particular spacing between the products P is established in the transporting direction. This is carried out by way of a jump in speed between the feeding belts 230 and the smart belts 250, i.e. the first smart belt 250 following the feeding belts 230 is at a higher speed than the feeding belt 230. However, during this jump in speed, positional deviations occur between the successive individual products P on the parallel lanes SM1, SM2, SM3 in the conveying direction, i.e. the individual products on the lanes arranged alongside one another are not located in a line or not at the same height or position in the conveying direction, i.e. they are not arranged sufficiently parallel to ox alongside one another.

It is thus the task of the further, smart belts 250 that follow in the conveying direction to reduce these positional deviations to a predetermined, permissible degree. The length or conveying section and/or the speed of the individual smart belts 250 is preferably measured such that, at every point in time there is always only one product P located on an individual smart belt 250. At the transition not only of the products P from the feeding belts 230 to the smart belts 250 but also at the transition from, a first smart belt to the next, subsequent smart belt, the positions of the products P on the conveying belts and in particular the differences in position are measured by means of sensor devices, in particular by means of optical sensors. By means of a higher-level control device, the individual conveying belts are then controlled such that the differences in position, between the individual products P on the lanes SM1, SM2, SM3 arranged parallel to one another are reduced. over the conveying section so that the produces is that in each case belong together of the lanes SM1, SM2, SM3 arranged alongside one another are aligned with one another at the end of the conveying section, and are located as far as possible parallel to one another or in a line. For this purpose, an ideal position of the products is calculated and predetermined as a desired value, with the smart belts 250 then being regulated such that those belts on which the products are running ahead compared to this ideal position are slowed, down by a suitable amount. By contrast, those smart belts on which the products are lagging behind compared with the ideal position are accelerated by a suitable amount.

Since, as mentioned above, in each case only one product P is located on in each case one smart belt 250 in the conveying direction and the smart belts 250 thus have only a relatively short length or conveying section, it is possible, with each stage of the smart belts 250, to achieve in each case only a certain, limited improvement in the positional deviations of the products P. For this reason, a plurality of stages of the smart belts 250 have to be connected in succession (cascaded), and, depending on the application, as many smart belts are cascaded, as are required In each case to achieve a position of the products P that is as ideal as possible, i.e. a deviation of the actual position from the ideal position that is as small as possible, within predetermined tolerances, At the end of the cascade of smart belts 250, the products P should then have a position in the conveying direction and parallel to one another which is as close as possible to the ideal position of the products on a line perpendicular to the conveying direction. This situation is illustrated in FIG. 3 at the left-hand end of the conveying section.

From the smart belts 250, the produces P which are thus aligned substantially parallel to one another are then transferred to in teed belts 270, which transport them synchronously on parallel lanes to the tray loading suasion 300 and finally convey them into the packaging tray T, In the tray loading station 300, in each case one product P from in each case one of the lanes SM1, SM2, SM3 is thus transferred at the same time as in each case one product P from the in each case other lanes to in each case one row or the plurality of rows, arranged alongside one another, of the packaging tray T. Each row of the packaging tray T is thus filled at the sane time with a product P, i.e. a layer or group of products P is filled into the packaging tray T at the same time or at least within a permissible tolerance range, with the layer of the products P being formed from the individual products P arranged alongside one another which are fed by the conveying lanes SM arranged parallel to one another.

After the packaging tray T has been filled with a layer of products P, the packaging tray T is moved or cycled on by one position in the tray loading station 300, in order to be able to receive the next fed layer of products P, The packaging tray T has in this case to be moved on by a distance, such that it can receive the next upcoming layer of products P next to the preceding layer. During the feeding of the products P via the infeed belts 270, there must be a minimum spacing between the successive layers, said minimum, spacing being sufficient for moving on and positioning the packaging tray T to receive the next layer of products Since the products P are fed continuously by the conveying lanes SM to the transfer station 300, continuous filling of the packaging trays T and continuous transporting away of the completely filled packaging trays has to be realized in order not to stop the product flow, in this case, it is in particular also necessary to continue the continuous filling without interruptions when a packaging tray T has been completely filled and subsequently a next packaging tray is filled. The packaging trays T must for this purpose be provided in the filling station 300 in particular such that a first, completely filled packaging tray T and a subsequent empty packaging tray T to be filled next are arranged and are moved on m each case by one position such that a next group or layer of the individual products P can be transferred from the lanes SM arranged parallel to one another into the rows of the next, upcoming empty packaging tray T, once the preceding layer or group of the individual products P has been transferred into the rows of the preceding packaging tray T that has now been completely filled. In this case, it is necessary to ensure that continuous filling of the packaging trays T takes place without the product stream being interrupted.

The packaging trays T are typically provided stacked and after being separated are moved into a tray manipulator which moves the trays into the filling station 300 and moves them on cyclically there. Completely filled trays are then removed from the filling station 300 by the tray manipulator and transferred (for example via a discharging slide) to a subsequent conveying system for further processing and in particular further packaging. The tray manipulator can be formed for example by a chain or a toothed belt having drivers, for example as a link chain conveyor.

The tray manipulators known in the prior art are typically formed such that, on account of structural boundary conditions, the position in which a new, empty tray is inserted into the tray manipulator is at a certain distance from the filling station. Once a tray has been completely filled, the tray manipulator has to remove the filled fray from the filling station and move the next, empty tray into the filling station. In the embodiments known in the prior art, the product stream had to be stopped for this time. This thus entails the disadvantage that there are losses of output on account of the down times and that furthermore the products P have to be fixed to the infeed belts 270 by additional measures, a vacuum frequently being used for this purpose. As a result, additional energy costs and maintenance costs and downtimes for cleaning the vacuum devices arise. The tray manipulators known from the prior art are therefore unsuitable for a continuous, uninterrupted product stream and consequently for the purposes of the present invention.

The tray manipulator of the present invention is therefore configured as a multi-section conveying device, in particular what is known as a multi-section race track. While one section of this conveying device moves the tray on in a cyclical manner in the filling station, the next upcoming tray is inserted into a compartment of a second section, of the multi-section conveying device, wherein this next tray is positioned directly adjoining the preceding tray in the filling station. After the first tray has been completely filled, the next tray is thus ready in the filling station without a time delay and without being spaced apart from the preceding tray. As a result, the filling process can be continued without interruption and the stream of the products P arriving in the filling station 300 does not have to be stopped.

Thus, overall, a packaging machine is created, wherein filling of multi-row packaging frays with piece-form products at high speed, i.e. with a high machine output, is brought about.

The invention claimed is:

1. A method for filling a multi-row packaging tray with piece-form products, characterized by the following steps of:
   a. dividing up a single-row stream of piece-form products onto a plurality of lanes arranged substantially parallel to one another in order to convey the products further, wherein the step of dividing up the single-row stream of products comprises the steps of dividing up the single-row stream of products into successive groups of piece-form products and conveying the product groups further; and feeding one respective product group respectively to one of the lanes arranged substantially parallel to one another;
   b. synchronizing the individual streams of products on the plurality of lanes with one another such that one product from one lane can be transferred to the packaging tray substantially at the same time as one respective product from each of the other lanes;
   c. transferring the products to the packaging tray in the form of a first layer, wherein in each layer, one product from each lane is transferred to a corresponding row of the packaging tray; and
   d. wherein, prior to the synchronization of the product streams on the lanes arranged substantially parallel to one another, a gapless product stream composed of the individual product groups is formed on each lane.

2. The method as claimed in claim 1, characterized in that the successive product groups are fed cyclically to the lanes such that lanes arranged alongside one another are fed in succession with one product group respectively.

3. The method as claimed in claim 1, characterized in that the step of synchronizing the product streams on the lanes arranged substantially parallel to one another comprises the following steps of:
   a. separating out the product stream on each lane such that respectively successive individual products from the product stream are conveyed further at a spacing from one another;
   b. controlling the speed of further conveying of the individual products on the lanes arranged substantially parallel to one another, such that the products on all the lanes are in positions at the end of the lanes such that each product from each lane is transferred to the packaging tray at substantially the same time as the products from the other lanes.

4. The method as claimed in claim 1, characterized in that the packaging tray is moved on by one position such that a second layer of the individual products can be transferred from the lanes arranged substantially parallel to one another into the rows of the packaging tray once the first layer of the individual products has been transferred into the rows of the packaging tray.

5. The method as claimed in claim 4, characterized in that a completely filled packaging tray and a subsequent empty packaging tray to be filled next are arranged in such a way and are moved on by one position such that a third layer of the individual products can be transferred from the lanes arranged substantially parallel to one another into the rows of the empty packaging tray once a preceding layer of the individual products has been transferred into the rows of the preceding packaging tray, without the product stream being interrupted.

6. The method as claimed in claim 1, characterized in that the single-row product stream is formed from fed piece-form products before being divided up onto the plurality of lanes arranged substantially parallel to one another.

7. The method as claimed in claim 6, characterized in that, after their production, the piece-form products are fed on the plurality of lanes arranged substantially parallel to one another.

8. An apparatus for filling a multi-row packaging tray with piece-form products, characterized by the following features:
   a. a first apparatus for dividing up a single-row stream of piece-form products onto a plurality of lanes arranged substantially parallel to one another for conveying the products further in a conveying direction;
   wherein the first apparatus for dividing up the single-row stream of products comprises the following features:
      a conveying device for dividing up the single-row stream of products into successive groups, or individual streams, of the piece-form products and for conveying the product groups further; and a distribution device for feeding one product group to one of the respective lanes arranged substantially parallel to one another;
   b. a second apparatus for synchronizing the individual streams of products with one another on the plurality of lanes such that one product from one lane can be transferred to the packaging tray substantially at the same time as one respective product from each of the other lanes, wherein the second apparatus comprises:
      i. a first set of conveying devices for separating out the individual product stream on each lane such that respectively successive individual products from the individual product stream are conveyed further at a spacing from one another; and
      ii. control devices for controlling the speed of further conveying of the individual products on the lanes arranged substantially parallel to one another, such that the products on all the lanes reach positions at the end of the lanes such that each product from each lane is transferred to the packaging tray at substantially the same time as the products from the other lanes; and
   c. a third apparatus for transferring the products to the packaging tray, wherein in each case one product from each lane is transferred to a corresponding row of the packaging tray;
   d. wherein, a second set of conveying devices is arranged upstream, in the conveying direction of the single-row stream of products, of the second apparatus for synchronizing or at an inlet thereto, said second set conveying devices forming a gapless product stream composed of the individual product groups on each lane.

9. The apparatus as claimed in claim 8, characterized in that the conveying device for dividing up and conveying the product streams or groups further is movable to and fro in the conveying direction of the product stream, and also comprises a device for counting the piece-form products, in order to form product groups with a predetermined number of piece-form products at a predetermined spacing from one another.

10. The apparatus as claimed in claim 8, characterized in that the distribution device for feeding the product groups to the lanes arranged substantially parallel to one another comprises a deflecting belt that is displaceable substantially transversely to the conveying direction of the product stream and supplies the successive product groups cyclically to the lanes such that lanes arranged alongside one another are fed in succession with respectively one product group.

11. The apparatus as claimed in claim 8, characterized in that a plurality of individual conveying devices are arranged in succession in the conveying direction of the product stream and are formed such that they convey in each case only one individual product, wherein sensor devices are arranged between the individual conveying devices in the conveying direction of the product stream, said sensor devices detecting in each case the position of the product on each individual conveying device in the conveying direction of the product stream, and wherein the sensor devices interact with control devices which control the speed of the individual conveying devices depending on the respectively detected position of the product on each individual conveying device.

12. The apparatus as claimed in claim 8, characterized by tray conveying devices which move the packaging tray on by one position such that a next group of the individual products can be transferred from the lanes arranged substantially parallel to one another into the rows of the packaging tray once a preceding group of the individual products has been transferred into the rows of the packaging tray.

13. The apparatus as claimed in claim 12, characterized by the tray conveying devices which arrange a completely filled packaging tray and a subsequent empty packaging tray to be filled next in such a way and move them on by one position such that a next group of the individual products can be transferred from the lanes arranged substantially parallel to one another into the rows of the empty packaging tray once a preceding group of the individual products has been transferred into the rows of the preceding packaging tray, without the product stream being interrupted.

14. The apparatus as claimed in claim 8, characterized in that apparatuses for forming the single-row product stream from fed piece-form products are arranged upstream, in the conveying direction of the product stream, of the first apparatus for dividing up the single-row product stream onto the plurality of lanes arranged substantially parallel to one another.

15. The apparatus as claimed in claim 14, characterized by a plurality of product lanes arranged substantially parallel to one another for feeding the piece-form products after their production, and by a conveying device for combining the products from the feeding lanes into a single conveying lane in order to form the single-row product stream.

* * * * *